US007856819B2

(12) United States Patent
Chirpaz et al.

(10) Patent No.: US 7,856,819 B2
(45) Date of Patent: Dec. 28, 2010

(54) HYDRAULIC CIRCUIT FOR A PUBLIC WORKS VEHICLE AND VEHICLE COMPRISING ONE SUCH CIRCUIT

(75) Inventors: Jean-Marc Chirpaz, Pollieu (FR); Philippe Charvieux, La Tour du Pin (FR); Christophe Gostomski, Virieu le Grand (FR)

(73) Assignee: Volvo Compact Equipment SAS, Belley (FR)

(*) Notice: Subject to any disclaimer, the term of this patent is extended or adjusted under 35 U.S.C. 154(b) by 545 days.

(21) Appl. No.: 11/915,290

(22) PCT Filed: May 27, 2005

(86) PCT No.: PCT/FR2005/050384

§ 371 (c)(1), (2), (4) Date: Feb. 7, 2008

(87) PCT Pub. No.: WO2006/125873

PCT Pub. Date: Nov. 30, 2006

(65) Prior Publication Data

US 2008/0196949 A1 Aug. 21, 2008

(51) Int. Cl.
*F16D 31/02* (2006.01)

(52) U.S. Cl. ........................................ 60/456

(58) Field of Classification Search .................... 60/456

See application file for complete search history.

(56) References Cited

U.S. PATENT DOCUMENTS 4,354,351 A 10/1982 Dezelan
4,558,631 A 12/1985 Fassbender
4,757,685 A 7/1988 Burckhartzmeyer
5,927,072 A 7/1999 Vannette
6,073,536 A 6/2000 Campbell

FOREIGN PATENT DOCUMENTS

EP 1126088 A2 8/2001
EP 1479920 A2 11/2004

*Primary Examiner*—F. Daniel Lopez
(74) *Attorney, Agent, or Firm*—Novak Druce + Quigg, LLP

(57) ABSTRACT

The invention relates to a hydraulic circuit (20) for public works vehicles. The circuit comprises: a pump (21) which is driven by a heat engine (22) using a load sensing technique; a hydraulic motor (10) which is used to move one part of the vehicle (8) and a set of hydraulic actuators (12-14); at least one distributor (29) which supplies the hydraulic actuators (12-13) in a controlled manner; and a device (45) for cooling the fluid circulating through the circuit. The inventive circuit is characterised in that it comprises: a pressure-reducing device (33) which is connected to the outlet of the pump (21) and which delivers a first pressure level, said device (33) being connected to the feed port (34) of the hydraulic motor (10); and an assembly which connects a check valve (40) and a calibrated orifice (41) in parallel, said assembly being connected downstream of the feed port (34) of the hydraulic motor and the return line (36) of the distributor (29) and upstream of the cooling device (45).

3 Claims, 3 Drawing Sheets

HYDRAULIC CIRCUIT FOR A PUBLIC WORKS VEHICLE AND VEHICLE COMPRISING ONE SUCH CIRCUIT

TECHNICAL FIELD

The invention relates to the field of public works vehicles, in particular excavators and other similar vehicles, equipped with a hydraulic circuit for moving the various parts which compose it.

More precisely, the invention relates to the type of vehicles equipped with a combustion engine which drives a pump whose flow is regulated according to the "load sensing" principle, that is to say in which the flow delivered by the pump is adjusted with respect to a setpoint or a demand, as opposed to "open center" systems.

The invention is aimed more particularly at a design of the hydraulic circuit of this type of vehicle that proves to be particularly advantageous by virtue of the fact that it makes it possible to provide various functions which are essential to the efficient operation of a vehicle while allowing a reduction in the number of hydraulic pumps required.

PRIOR ART

In hydraulic systems operating on the "load sensing" principle, there have up until now existed two configurations for supplying the various consumer circuits.

In a first configuration, the supply is achieved by means of two valves, one situated on the pump and the other at the inlet of the main distributor. These valves are activated alternately as a function of the operating situation of the machine: the first is activated when the vehicle operates in "standby", that is to say when it has just started up or when no movement of the work equipment or of the turret is performed. This first valve is also activated when the vehicle operates with a low flow demand. The second valve is activated when the work flow is larger. It will be appreciated that this type of system is relatively complex and entails very difficult management of failures or disruptions of the system.

An alternative configuration consists in using two separate pumps, both driven by the combustion engine. A main "load sensing" pump is dedicated to the power circuit, while an auxiliary pump serves to supply circuits providing auxiliary functions, requiring less power. Featuring particularly among these various functions is the supply under an intermediate pressure, of around a few tens of bar, intended to supply the machine control circuit. It is this intermediate pressure which supplies the various hydraulic manipulators responsible for controlling the various members of the vehicle.

It is also necessary that the fluid of the entire circuit is cooled when the vehicle is in a rest or "standby" position. In existing systems, the auxiliary circuit provides fixed scavenging of around a few tens of liters per minute. Specifically, in that case, the flow is virtually zero on the power circuit, but it is appropriate to ensure a minimum flow in the auxiliary control circuit to avoid any excessive rise in the oil temperature.

Another important function provided by the auxiliary pump and circuit concerns the prevention of cavitation phenomena which may arise in the various hydraulic actuators. Specifically, when a movement command is interrupted in an actuator, the supply of fluid thereto is cut virtually immediately, yet the mechanical inertia means that the moving parts of the actuator are not immediately immobilized. This results in suction phenomena which cause pressure drops. The pressure can fall below a threshold at which cavitation phenomena occur. These cavitation phenomena are particularly prejudicial in terms of the service life of the actuators.

Thus, a hydraulic motor whose supply of flow is cut behaves as a pump in the standstill phase of the moving part. To avoid cavitation phenomena, the actuators, in particular the hydraulic motors, are equipped with a boost port via which a fluid is supplied when the pressure within the actuator drops excessively.

Document EP 1 126 088 illustrates an example of assembling a hydraulic circuit which makes it possible to provide a boost flow capable of compensating for the pressure drop subsequent to a sudden stopping of the supply to the cylinder actuators.

More precisely, the hydraulic circuit described in that document comprises a pressure reducer connected to the outlet of the plump for supplying the actuator liable to experience cavitation. This reducer is connected upstream of a nonreturn valve itself situated on the fluid return line. This reducer delivers a pressure at a level which is lower than the setting pressure of the nonreturn valve, such that when the pressure drops considerably in the actuator, this reducer makes it possible to deliver a sufficient boost flow to avoid the appearance of cavitation phenomena.

This device is not suitable for treating any heating of the fluid which might occur when the vehicle is in rest mode or in "standby" mode. It also requires an additional particular pump specific to the auxiliary circuit in order to perform the scavenging function and to provide the control pressure.

SUMMARY OF THE INVENTION

One of the objects of the invention is to make it possible to simultaneously provide the boost, scavenging and control functions irrespective of the vehicle operating mode, that is to say whether it is in rest mode or in normal operation, or else during sudden interruptions in the control of the actuators which are liable to generate cavitation phenomena.

One of the objectives of the invention is to provide this versatility with a reduced number of hydraulic components. The invention is aimed especially at supplying the whole of the hydraulic circuit of the vehicle using just one hydraulic pump.

The invention thus relates to a hydraulic circuit for a public works vehicle, which comprises a hydraulic pump driven by a combustion engine using a "load sensing" logic. This hydraulic circuit also comprises a hydraulic motor, responsible for moving a part of the vehicle, and also a set of hydraulic actuators.

These actuators are supplied in a controlled manner by a distributor. The hydraulic circuit also comprises a device for cooling the fluid which circulates therein.

According to the invention, this circuit is characterized in that it comprises:

- a pressure-reducing device connected to the outlet of said pump and delivering a first pressure level, this reducing device being connected to the boost port of said hydraulic motor;
- an assembly connecting a nonreturn valve and a calibrated restriction in parallel, which may thus be termed a "mono-directional restrictor". This assembly is connected downstream of the boost port of the hydraulic motor and the return line of the distributor, and upstream of the cooling device.

Thus, the combination of the characteristic pressure reducer, nonreturn valve and calibrated origin makes it advantageously possible to simultaneously provide the boost and scavenging functions irrespective of the vehicle operating mode.

Specifically, in rest or "standby" mode, a minimum flow is ensured in the cooling device owing to the presence of the restriction calibrated for this purpose. The entire scavenging flow then passes through this restriction. Thus, the invention makes it possible to reduce the torque absorbed by the pump when cold, since the scavenging flow to be provided is small. This results in a more rapid heating of the system. This is because a lower scavenging flow means that the oil in the drainage circuit of the pump heats up more quickly.

When the vehicle operates in normal mode, with continuous movements of the various actuators, the return line of the distributor for controlling these actuators then discharges into the cooling device. This flow passes via the nonreturn valve and the calibrated restriction. The pressure drop at the terminals of this assembly forming the mono-directional restrictor is then balanced by itself. In other words, the level of pressure loss at the terminals of the mono-directional restrictor depends on the operating phase of the system.

Finally, in the event of a sudden interruption in the rotational control of the hydraulic motor, a boost flow makes it possible to avoid cavitation phenomena. This boost flow is delivered by the pressure reducer, which saturates the calibrated restriction at the same time. This flow can be particularly high for a short period.

In the case of normal operation, that is to say when the "load sensing" pump is under load and delivers a greater flow than the flow delivered in "standby" mode, the scavenging flow is essentially ensured by virtue of the return line of the distributors for controlling the actuators. The characteristic reducer thus remains closed, therefore limiting the consumption at the main pump. The combination of the three characteristic hydraulic components, namely: the pressure reducer, the nonreturn valve and the calibrated restriction, makes it possible to obtain a hydraulic operation of the vehicle by means of just one pump, by comparison with the prior art systems which include a main pump and an auxiliary pump responsible for the scavenging, boost and control functions.

In practice, the calibrated restriction and the nonreturn valve can be in one and the same hydraulic component when the calibrated restriction is formed in the moving body of the nonreturn valve. This configuration makes it possible to reduce the overall size of the equipment required to produce this dual function, along with the problems associated with connection.

In a complementary manner, said hydraulic circuit advantageously comprises a second pressure reducer capable of delivering a second pressure level intended for the vehicle control members.

BRIEF DESCRIPTION OF THE FIGURES

The manner of implementing the invention, together with the resulting advantages, will become clearly apparent from the description of the embodiment model which follows, supported by the appended figures in which.

MANNER OF IMPLEMENTING THE INVENTION

Figure 1:
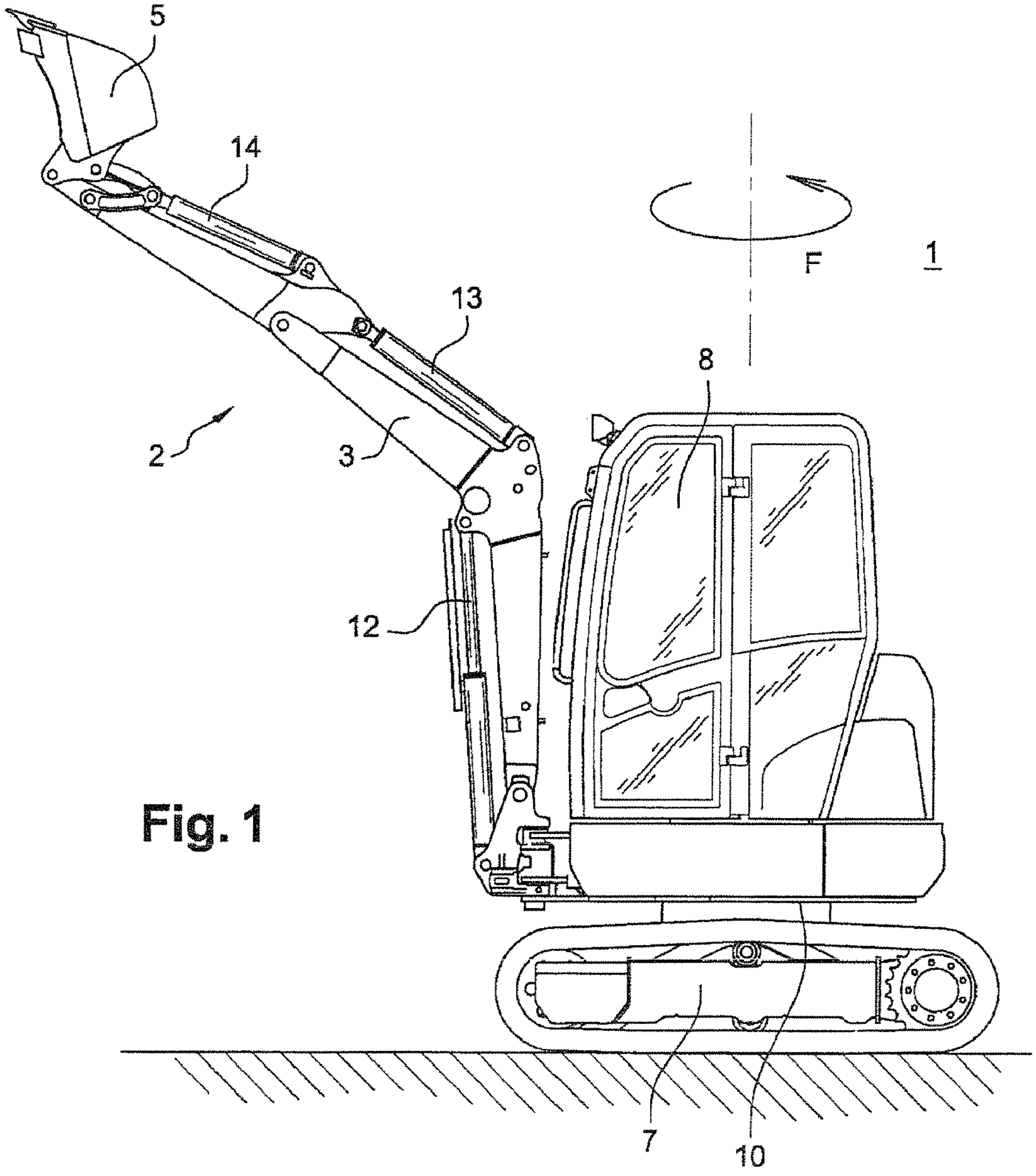
FIG. 1 is a side view of a public works vehicle on which the hydraulic circuit according to the invention can be mounted.

As has already been explained, the invention relates to public works vehicles in the broad sense, using a hydraulic circuit for operating the various elements which compose it. An example of such a vehicle is illustrated in FIG. 1. Such a vehicle 1 comprises work equipment 2 whose various elements 3-5 are articulated with respect to one another and with respect to the vehicle chassis 7. The cab 8 and the work equipment 2 are advantageously mounted on a turret, with a capacity to slew in the direction of the arrow F so that the work equipment can be rotated and optimally positioned. The cab 8 and the work equipment 2 are rotated by a hydraulic motor 10 controlled by means of a manipulator which is present in the cab.

The displacement of the work equipment 2 by articulating the various elements 3-5 which compose it is achieved via the various hydraulic cylinder actuators 12-14 controlled as a function of the desired movement.

The hydraulic circuit 20 according to the invention is illustrated in a highly schematic manner in FIG. 1 and comprises a single hydraulic pump 21 which is driven by a combustion engine 22 and whose flow is regulated by "load sensing" device which there is no need to describe in further detail. This hydraulic pump 21 supplies a high-pressure power circuit 24 whose pressure is typically above 100 bar. This power circuit 24 supplies the distributor 29 controlling the various cylinder actuators 12-14 responsible for the movements of the work equipment, and also the hydraulic motor 10 via the conduit 31 in order to provide the slewing movement.

The hydraulic pump 21 also supplies a control circuit 26, situated downstream of a pressure reducer 27, delivering a pressure of around a few tens of bar, compatible with the hydraulic manipulators used for controlling the cylinder actuators 12-14 via the distributor 29.

In a complementary manner, the hydraulic circuit comprises an auxiliary circuit 32 which makes it possible to provide the characteristic boost and scavenging functions. More precisely, this auxiliary circuit comprises a pressure reducer 33 connected to the outlet of the pump 21. This reducer 33 delivers a first pressure level. The outlet of the pressure reducer 33 supplies the boost port 34 of the hydraulic motor 10. Likewise, to the conduit 35 connected at the outlet of the reducer 33 is connected the return line 36 of the distributor 29.

Advantageously, the reducer 33 used is a reducer with a slide member, which makes it possible to prevent noise nuisance.

Figure 2:
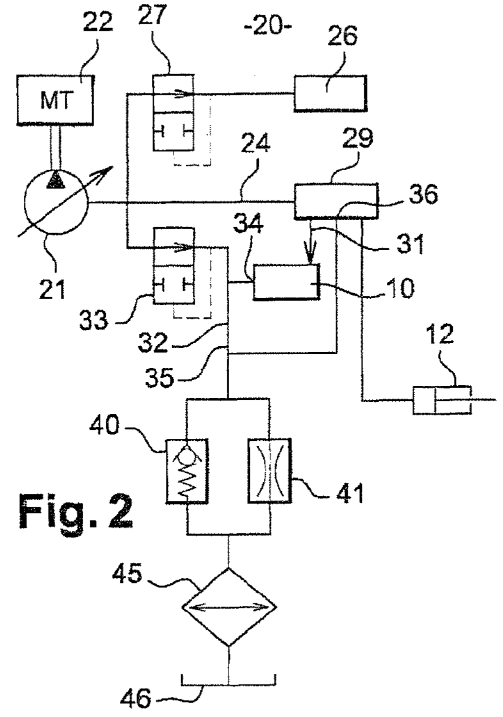
FIG. 2 is a simplified diagram illustrating the main elements of the hydraulic circuit of the invention.
Figure 2A:
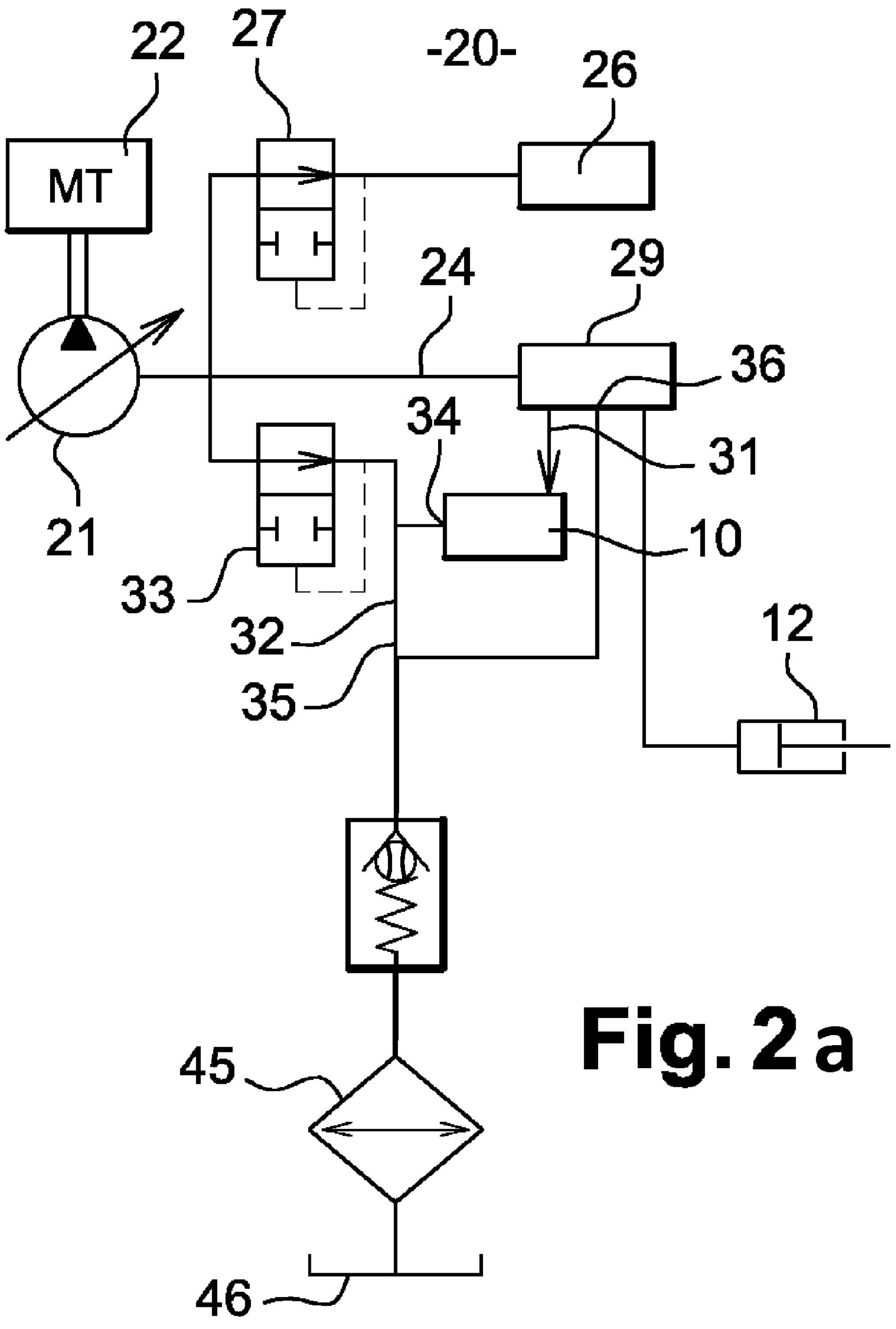
FIG. 2*a* is a slightly modified version thereof showing an alternate embodiment.

Downstream of the connection of the return line 36 to the conduit 35 are arranged the characteristic assembly composed of a nonreturn valve 40 connected in parallel with a calibrated restriction or orifice 41. In the form illustrated in the diagram of FIG. 2, these two components are represented separately since they perform different hydraulic functions. However, in practice, these two functions are provided by one and the same material component as a result of drilling the calibrated orifice directly inside the moving body of the nonreturn valve, as illustrated in FIG. 2*a*. The assembly consisting of the nonreturn valve 40 and the calibrated orifice 41 is connected upstream of the cooling devices 45, itself discharging into the oil reservoir 46.

The calibrated orifice 41 is dimensioned to let through a sufficient scavenging flow to limit the heating of the circuit, typically of around a few tens of liters per minute.

The hydraulic circuit according to the invention has the operation described below, this being a function of the vehicle operating mode.

Figure 3:
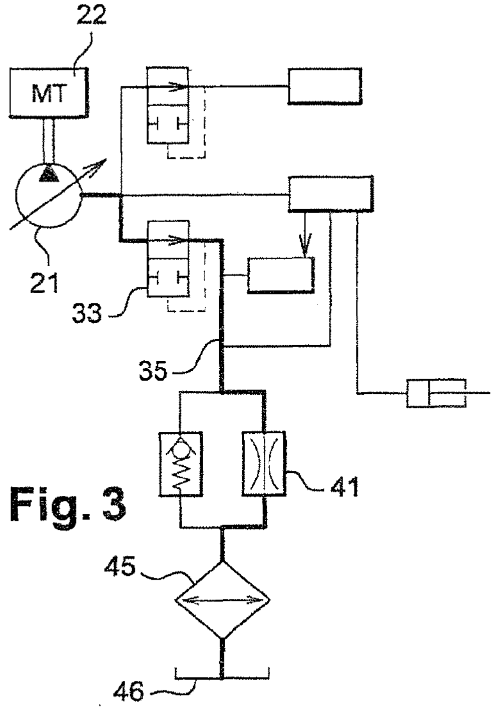
FIGS. 3 to 5 are diagrams identical to the one shown in FIG. 2, illustrated in three separate operating modes of the vehicle and in which the conduits traversed by a fluid are shown by a thick line.

Thus, as illustrated in FIG. 3, when the vehicle is in "standby" mode, that is to say when it has just started up or when no movement of the work equipment or of the turret is performed, the pump 21 delivers a minimum flow. The reducer 33 is then conducting. The calibrated orifice 41 is thus dimensioned to ensure a flow which is tailored to the cooling requirements. Two scenarios can thus be distinguished according to the temperature of the fluid. When the fluid is at an operating temperature, of around 50 to 60° C., the flow allowed through the calibrated orifice 41 is above a minimum defined necessary for the effective cooling of the circuit by the cooler 45.

When, however, the fluid is still cold, its viscosity is higher and the pressure drops generated are larger. The flow allowed through the calibrated orifice is thus smaller, typically of around a few liters per minute. The flow in the cooler 45 is therefore less, but the cooling requirement is smaller, since the fluid is still cold.

Furthermore, the invention makes it possible to reduce the torque absorbed by the pump when cold, since the scavenging flow to be provided is small. This results in a more rapid heating of the system. Since the scavenging flow is less, the oil in the pump drainage circuit heats up more quickly. There is therefore an improvement in relation to the existing systems in terms of energy consumption and of service life of the components used.

Figure 4:
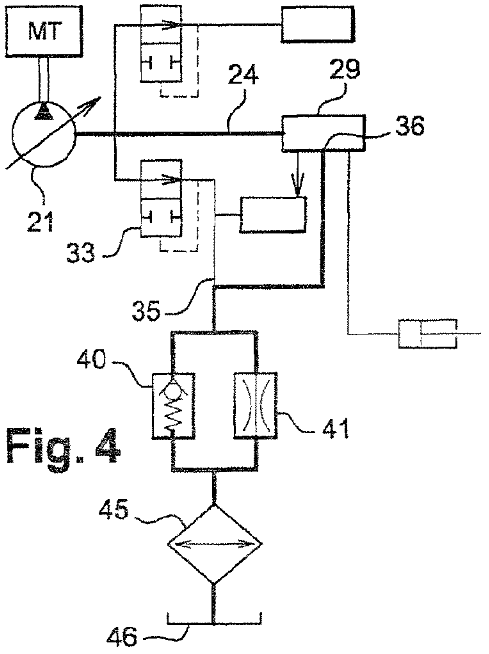

When the vehicle is in a normal operating mode, that is to say when the various actuators, in particular the cylinder actuators, are supplied with continuity of flow, the hydraulic layout operates as illustrated in FIG. 4. In this case, the return line 36 of the distributor 29 supplying the actuator 12 is at a pressure level such that, taking account of the pressure drops existing in the orifice 41, the pressure at the outlet of the reducer 33 is above its triggering threshold. In other words, the pressure reducer 33 remains closed. If the pressure in the return line in the distributor is sufficiently high, and typically above the opening pressure of the nonreturn valve 40, the latter opens and the return flow passes through the cooler 45. However, if the pressure in the return line of the distributor 29 is too small, the flow passes again through the calibrated restriction 41, since there is then a return to "standby" mode.

It will thus be noted that, in this normal operating mode, the single main pump 21 does not discharge via the reducer 33, resulting in optimized behavior in terms of energy balance.

Figure 5:
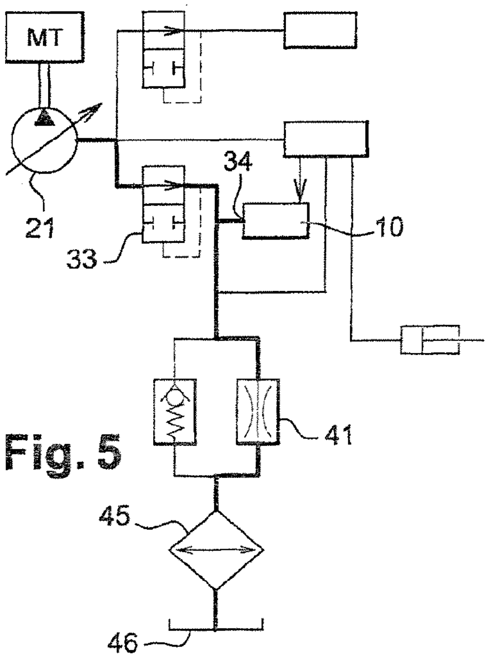

The hydraulic layout according to the invention also has a major advantage in respect of managing the potential cavitation phenomena. Specifically, in the event of the control of the hydraulic motor 10 being interrupted, schematically represented by the noncirculation of fluid in the power circuit (FIG. 5), the mechanical inertia means that the combustion engine operates in the manner of a pump. In this case, the pressure in the boost port 34 of the motor would tend to drop significantly. However, the presence of the characteristic reducer 33 means that the latter opens and allows a considerable flow delivered very rapidly by the main pump 21.

This boost flow makes it possible to avoid the appearance of cavitation phenomena, since the reducer 33 in this case delivers the flow necessary for avoiding the cavitation phenomenon, and also the flow necessary for saturating the calibrated restriction 41, associated with the pressure level generated by the cavitation conditions.

It emerges from the foregoing that the circuit according to the invention has the main advantage of being able to provide boost, control and scavenging functions by means of just one hydraulic pump.

Other advantages are:

a space saving in the machine by eliminating the geared pump used as an auxiliary pump in prior solutions;

scavenging optimized as a function of the temperature of the oil circuit, facilitated cold starting of the circuit and more rapid heating of the circuit;

simple diagnostics in the event of an incident;

a reduced system cost by combining various components in one and the same valve.

The invention claimed is:

1. A hydraulic circuit (20) for a public works vehicle, comprising:

a hydraulic pump (21) having an outlet and driven by a combustion engine (22) using a "load sensing" logic;

a hydraulic motor (10) with a boost port and responsible for moving a part (8) of the vehicle, and also a set of hydraulic actuators (12-14);

a distributor (29) having a return line and being responsible for a controlled supply of hydraulic fluid to said hydraulic actuators (12-14);

a cooling device (45) for the fluid circulating in said circuit;

a pressure-reducing device (33) connected to the outlet of said hydraulic pump (21) and delivering a first pressure level, said pressure-reducing device (33) being connected to the boost port (34) of said hydraulic motor (10); and an assembly connecting a nonreturn valve (40) and a calibrated restriction (41) in parallel, said assembly being connected downstream of said boost port (34) of the hydraulic motor and the return line (36) of said distributor (29) and being located upstream of said cooling device (45).

2. The hydraulic circuit as claimed in claim 1, wherein the calibrated restriction (41) is formed in a moving body of the nonreturn valve (40).

3. The hydraulic circuit as claimed in claim 1, wherein a second pressure reducer (27) is capable of delivering a second pressure level to vehicle control members (26) which control the hydraulic actuators.

* * * * *